(12) United States Patent
Fishman et al.

(10) Patent No.: US 6,542,535 B2
(45) Date of Patent: Apr. 1, 2003

(54) INDUCTION FURNACE WITH IMPROVED EFFICIENCY COIL SYSTEM

(75) Inventors: Oleg S. Fishman, Maple Glen, PA (US); Vladimir V. Nadot, Voorhees, NJ (US); Vitaly A. Peysakhovich, Moorestown, NJ (US); John H. Mortimer, Medford, NJ (US)

(73) Assignee: Inductotherm Corp., Rancocas, NJ (US)

( * ) Notice: Subject to any disclaimer, the term of this patent is extended or adjusted under 35 U.S.C. 154(b) by 39 days.

(21) Appl. No.: 10/041,187

(22) Filed: Jan. 8, 2002

(65) Prior Publication Data

US 2002/0122456 A1 Sep. 5, 2002

Related U.S. Application Data

(60) Provisional application No. 60/260,241, filed on Jan. 8, 2001.

(51) Int. Cl.[7] .................................................. H05B 6/06
(52) U.S. Cl. ........................ 373/150; 373/147; 373/151
(58) Field of Search ................................ 373/138, 139, 373/144–152, 154; 75/10.14, 10.15

(56) References Cited

U.S. PATENT DOCUMENTS

| | | | | |
|---|---|---|---|---|
| 1,852,214 A | * | 4/1932 | Melton | 373/150 |
| 2,090,692 A | * | 8/1937 | Northrup | 373/150 |
| 2,570,311 A | * | 10/1951 | Bohnet et al. | 373/150 |
| 3,331,909 A | * | 7/1967 | Kasper | 373/150 |
| 4,037,044 A | * | 7/1977 | Havas | 373/150 |
| 4,633,481 A | * | 12/1986 | Schwenninger | 373/152 |
| 5,490,869 A | * | 2/1996 | D'Obrenan et al. | 75/10.14 |
| 5,889,812 A | * | 3/1999 | Schluckebier | 373/151 |
| 5,940,427 A | * | 8/1999 | Hurtgen et al. | 373/150 |

* cited by examiner

Primary Examiner—Tu Ba Hoang
(74) Attorney, Agent, or Firm—Philip O. Post

(57) ABSTRACT

An induction furnace system has an active induction coil surrounding a crucible. A passive induction coil also surrounds the crucible. The passive induction coil is connected in parallel with a capacitor to form an L-C tank circuit. A source of ac current is provided to the active induction coil to produce a magnetic field that inductively heats and melts an electrically conductive material in the crucible. The magnetic field also magnetically couples with the passive induction coil to induce a current in the passive induction coil. This induced current generates a magnetic field that inductively heats and melts the material. The resistance of the L-C tank circuit is reflected back into the circuit of the active induction coil to improve the overall efficiency of the induction furnace system. The crucible may be open-ended to allow the passage of the electrically conductive material through the crucible during the heating process.

20 Claims, 12 Drawing Sheets

INDUCTION FURNACE WITH IMPROVED EFFICIENCY COIL SYSTEM

CROSS REFERENCE TO RELATED APPLICATIONS

This application claims the benefit of U.S. Provisional Application No. 60/260,241, filed Jan. 8, 2001.

FIELD OF THE INVENTION

The present invention relates generally to electric induction furnaces and more particularly to induction furnaces having improved efficiency coil systems.

BACKGROUND OF THE INVENTION

Electric induction furnaces are used to heat and melt metals and other electrically conductive materials. An induction furnace utilizes an induction coil that is powered from an ac power source. Alternating current flowing through the coil creates a magnetic field that is applied to the electrically conductive charge placed inside of the furnace's crucible. Eddy currents induced by the field in the charge can be used to heat, melt and superheat the charge. The magnetic coupling between the induction coil and charge is analogous to a magnetic transformer coupling. However an induction coil has a much higher leakage inductance than the leakage inductance of a magnetic transformer. Consequently an induction furnace's power factor is extremely low, typically ranging from 0.08 to 0.15, lagging and, therefore, an extremely inefficient load.

The conventional coreless induction furnace consists of a copper water-cooled helical coil with a ceramic crucible containing the charge. Alternating current in the coil generates a magnetic field that induces current into the conductive charge. As illustrated in FIG. 1(a), the induction furnace 100 can be viewed as a loosely coupled transformer where the turns of the primary coil are magnetically coupled to a single turn formed by the conductive melt 102. In the figure, $I_c$ represents the coil current and $I_m$ represents the current in the molten bath. Therefore, it can be assumed that the ratio of the current induced into the melt to the current in the coil approximates the number of coil turns. Maximum current density is induced on the circumference of the melt, with current exponentially decaying into the melt depth towards the center of the crucible.

The rate of decay is defined by a constant, namely the depth of current penetration into the metal, $\Delta_m$, as defined (in meters) by the following equation:

$$\Delta_m = \sqrt{\frac{2 \cdot \rho_m}{\mu_o \cdot \mu_m \cdot f}} = 503 \sqrt{\frac{\rho_m}{f}}$$

where: $\rho_m$=resistivity of the molten metal (in ohms/m);

$\mu_o \cdot \mu_m$=the product of absolute and relative permeability (with $\mu_o = 4\pi \times 10^{-7}$ and $\mu_m$, the relative permeability of the metal, in H/m); and f=the frequency of the coil current (in Hertz).

Induction furnaces are usually designed to satisfy the condition that the depth of current penetration into the metal is much less than the radius of the melt ($\Delta_m \ll r_m$).

The conventional shape of the melt is cylindrical. Most of the induced current is flowing in the outer layer of the melt with thickness equal to the depth of penetration, $\Delta_m$. The resistance, $R_m$, (in ohms) of this layer can be estimated by the following equation:

$$R_m = \frac{\rho_m \cdot 2\pi \cdot r_m}{h_m \cdot \Delta_m} = 0.0125 \cdot \frac{r_m}{h_m} \sqrt{\frac{f}{\rho_m}}$$

where $R_m$=resistance of the melt (in ohms);

$r_m$=radius of the melt;

$h_m$=height of the melt;

$\rho_m$, $\Delta_m$ and f are as previously defined.

Induction furnaces are principally single-phase devices. The supplied electric power is typically distributed over balanced three-phase lines. For optimal operation, induction furnaces operate at frequencies typically in the range of 100 to 10,000 Hertz. These frequencies are needed to maintain an optimal $\Delta_m/r_m$ ratio for electromagnetic stirring of molten metal in the furnace.

Solid state power converters generate the power at required frequency, voltage and current for induction furnaces. These converters utilize power semiconductors (such as SCR, IGBT or IGCT topologies). The solid state static power converter resolves the phase balancing problem. Input 3-, 6-, or 12-phase line voltages are rectified before being inverted into a single-phase medium-frequency electrical current. Full-wave rectification of multi-phase line voltage produces a low harmonic distortion on feeding electrical lines, thus eliminating the need for line filters. As illustrated in FIG. 1(b), the power converter consists of three major sections:

an ac to dc rectifier and dc filter;

a dc to ac medium-frequency inverter; and a bank of tuning capacitors.

Power supplied to the furnace is controlled automatically by varying the commutation timing of the inverter's solid state switching components. This timing determines the operating frequency, phase and amplitude of the furnace current.

There are two conventional implementations of static solid-state power converters, namely a current-fed inverter with a parallel capacitor bank and a voltage-fed inverter with series capacitor bank. FIG. 2(a) illustrates a furnace system utilizing a current-fed converter. FIG. 2(b) illustrates a furnace system utilizing a current-fed converter with series/parallel tank capacitors. FIG. 2(c) and FIG. 2(d) illustrate furnace systems utilizing a voltage-fed converter in full bridge and half configurations, respectively. Each of these power supply topologies comprises a rectifier and filter section 110; a solid state inverter section 120; and a tuning capacitor section 130. While the generally recognized symbol for an SCR is used in these set of figures, other solid state switching devices can be utilized in these applications.

In the current-fed inverter, as illustrated in FIG. 2(a), the power factor correction capacitor bank is usually connected in parallel to the furnace coil. The term "capacitor bank" is used here to designate one or more capacitors connected in series or parallel to be the equivalent circuit as shown in the figures. Both the capacitor bank and the coil are connected into the diagonal of a full-bridge inverter. This connection allows the reactive component of the coil current to bypass the inverter's solid state switching components. However, the inverter is exposed to the full furnace voltage. The values of inverter voltage may be higher or lower than the dc voltage on the rectifier. Therefore, dc rectifier and inverter sections must be decoupled by reactors. The reactors supply the inverter with constant dc current. They are acting as a filter and reservoir of energy. The inverter converts dc current into square wave current that is supplied to a parallel resonant circuit.

The furnace power in current-fed inverter systems is controlled by varying both inverter timing and dc voltage. When inverter voltage falls below dc rectifier potential, the output power cannot be controlled by variation in inverter commutation frequency alone. Additional control of the injected dc current is carried out by regulating the conduction phase angle of the rectifier SCRs. Such regulation will introduce distortion into the feeding electrical line unless filters are provided.

The main advantage of the parallel resonant inverter is that only part of the coil current is passed via solid state switching devices, thus saving the number of semiconductor devices. The inverter controls only part of the coil current. This, however, limits the controllability of the inverter. Using the smoothing dc reactors as temporary energy accumulators causes difficulties in starting the inverters. The energy in the reactors is kinetic (analogous to the energy of a flywheel)—it exists only when the dc current flows from the rectifier to the inverter. To accumulate the necessary energy in the smoothing dc reactor, a special starter network is used. When the parallel inverter is stopped, the energy from this reactor is expended using the solid state switches of the inverter as a crow bar circuit.

The advantage of lower current in the inverter solid state switching devices is offset by a high voltage to which these devices are exposed. This often requires stacking the devices in series, which in turn necessitates special dynamic voltage dividers. For small current-fed inverters connected to standard low voltage lines, a series/parallel connection of capacitors is used, as illustrated in FIG. 2(b), rather than a parallel resonant circuit.

From the standpoint of electric circuit theory, voltage-fed series resonant inverters, as illustrated in FIG. 2(c), represent a duality circuit to the current-fed parallel converter. The current smoothing reactors in the dc line are replaced by dc voltage filter capacitors. The output parallel resonant circuit is replaced by a series resonant circuit. The voltage on the inverter is constant and equal to the output voltage of the ac to dc rectifier. The full coil current flows through the inverter's SCRs and tuning capacitor bank. Such a configuration provides excellent controllability of the system. By controlling the timing of commutation of the inverter solid state switching devices, it is possible to rapidly change (within one oscillation period) the amount of energy circulating in the resonant circuit.

The potential electrical energy in the dc filter capacitor bank may be indefinitely maintained regardless of inverter status. During each cycle, the reactive power is flowing either from the filter to the furnace via the solid state switching devices or from the furnace to the filter via anti-parallel diodes.

Due to good controllability of the inverter section, there is no need to control dc voltage. Since phase control is not applied to the rectifier, the input power factor on the feeding line is relatively constant. No ac phase correction capacitors or line filters are required. Practical implementation of series resonant converters is even more simplified by utilizing a half-bridge inverter scheme as illustrated in FIG. 2(d).

A current-fed inverter operates with higher voltage, while a voltage-fed inverter operates with low voltage but full coil current. The voltage-fed inverter has better controllability and stores reactive energy entirely in the capacitors, which have lower losses than the dc reactors of the current-fed inverter. In all of these prior art configurations for induction furnace systems, the furnace coil is, as noted above, an extremely inefficient electrical load. Therefore, there exists the need for a higher efficiency coil system for an induction furnace.

BRIEF SUMMARY OF THE INVENTION

In one aspect, the present invention is an apparatus for and method of heating and melting electrically conductive material in the crucible of an induction furnace system that includes a passive induction coil surrounding a partial section of the crucible. The passive induction coil is connected to a capacitor to for m an L-C tank circuit. An active induction coil, surrounding a partial section of the crucible is supplied ac current from an ac power source. The ac current generates a first magnetic field that heats and melts the electrically conductive material and, by magnetic coupling with the passive coil, induces an induced current in the passive coil. This induced current generates a second magnetic field that heats and melts the electrically conductive material. The resistance of the L-C tank circuit is reflected into the circuit of the active induction coil to increase the efficiency of the induction furnace system. These and other aspects of the invention are set forth in the specification and claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE DRAWINGS

Figure 1A:
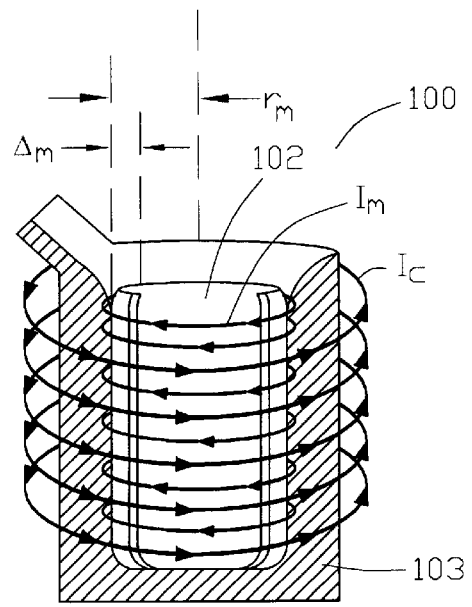
FIG. 1(a) is a cross sectional view of a conventional crucible illustrating the induced current distribution.
Figure 1B:
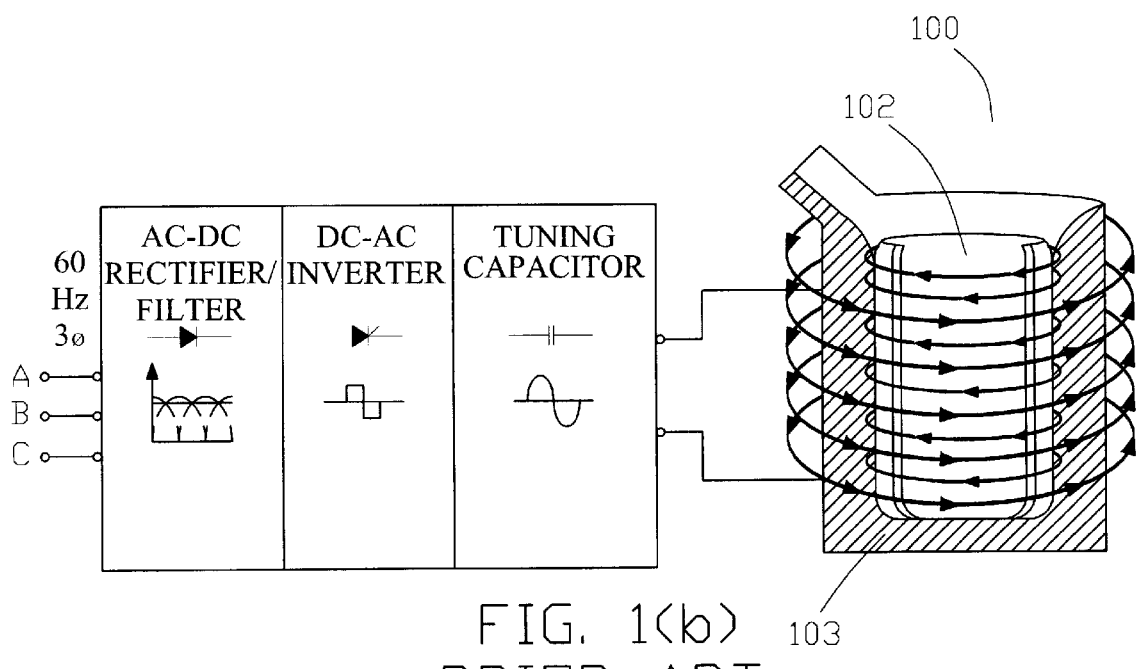
FIG. 1(b) is the crucible in FIG. 1(a) connected to a conventional power supply to form an induction furnace system.
Figure 2A:
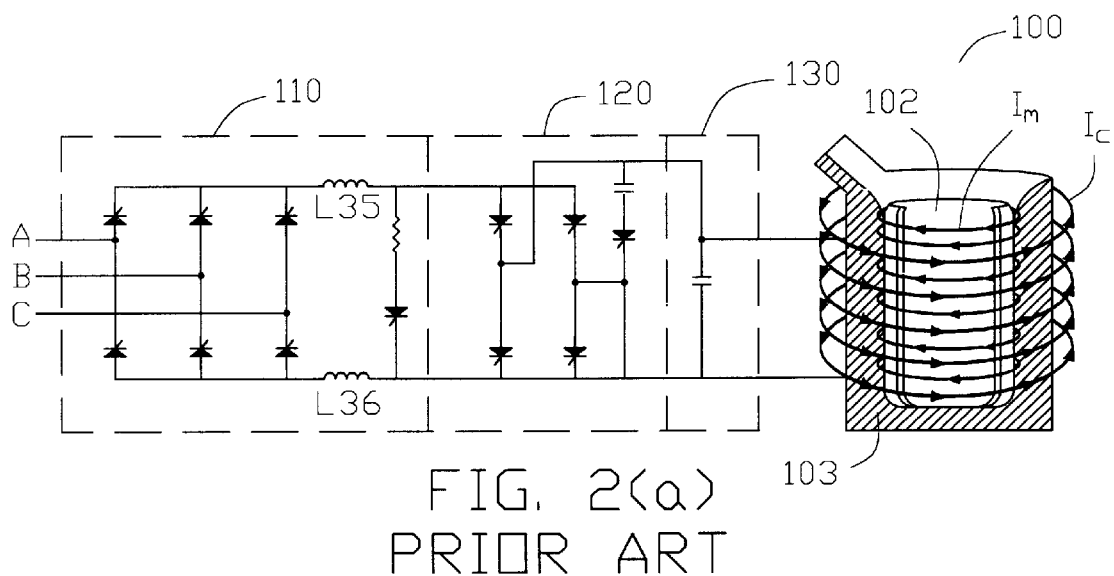
FIG. 2(a) is a diagrammatic plan of a conventional induction furnace system utilizing a current-fed converter.
Figure 2B:
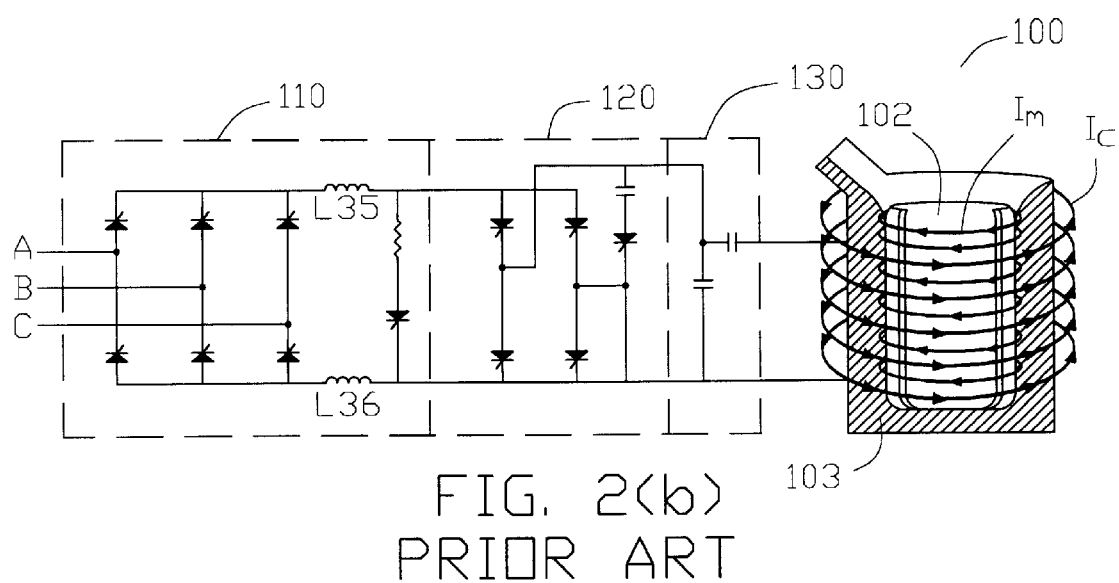
FIG. 2(b) is a diagrammatic plan of a conventional induction furnace system utilizing a current-fed converter with series/parallel tank capacitors.
Figure 2C:
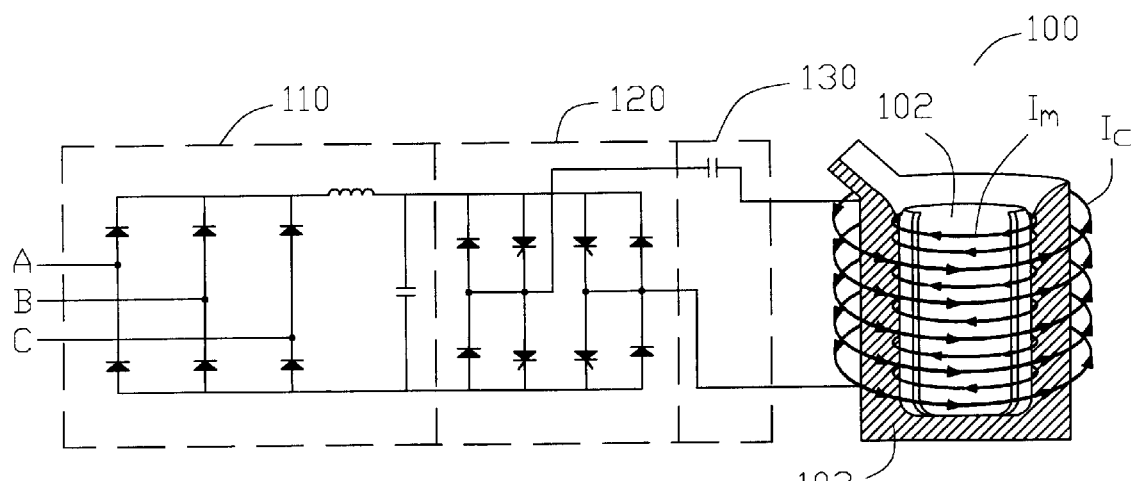
FIG. 2(c) is a diagrammatic plan of a conventional induction furnace system utilizing a voltage-fed inverter.
Figure 2D:
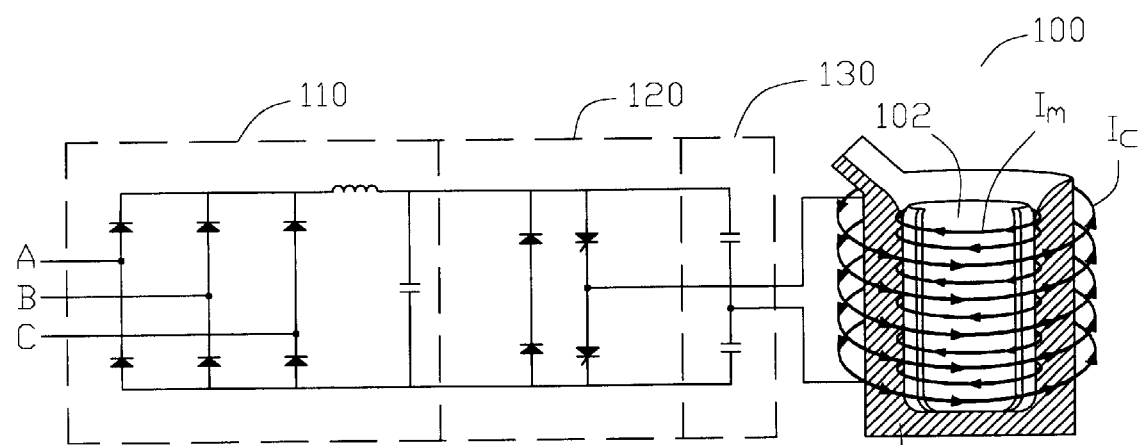
FIG. 2(d) is a diagrammatic plan of a conventional induction furnace system utilizing series tank capacitors.
Figure 3A:
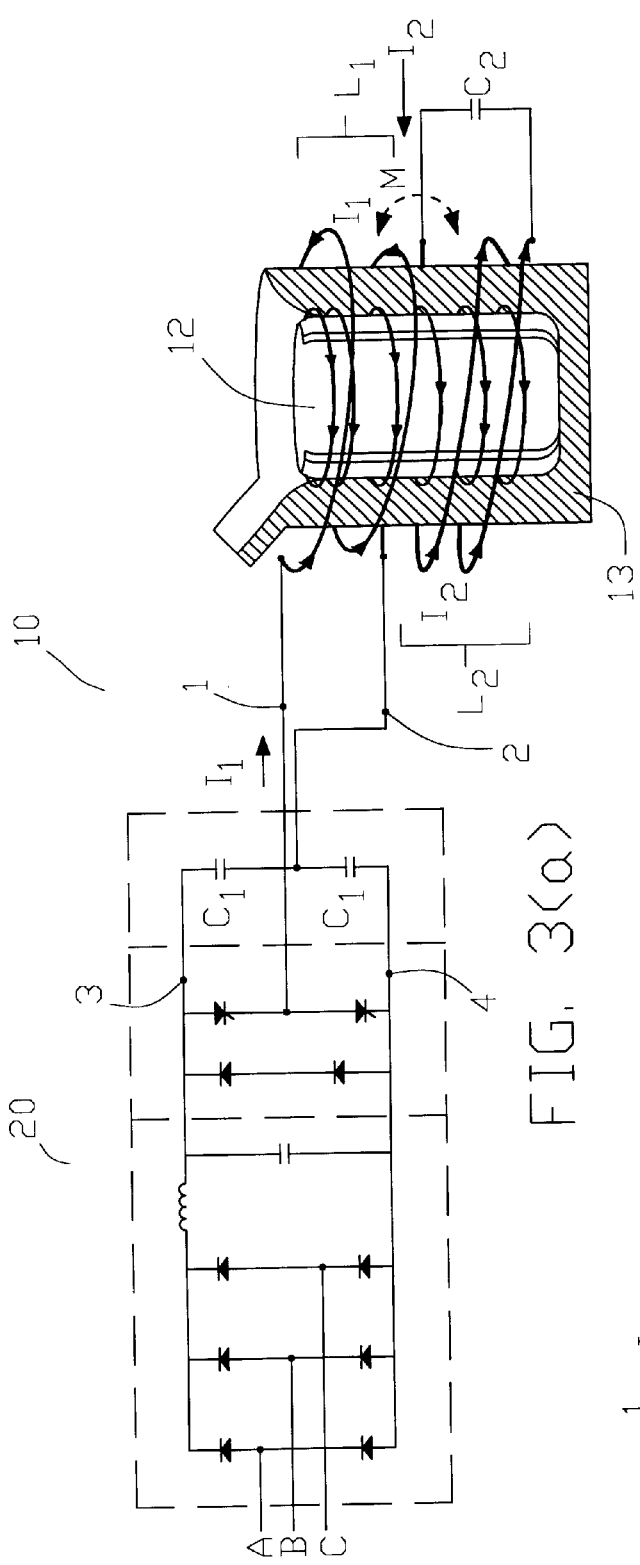
FIG. 3(a) is a diagrammatic plan illustrating one example of an induction furnace system with the improved efficiency coil system of the present invention.
Figure 3C:
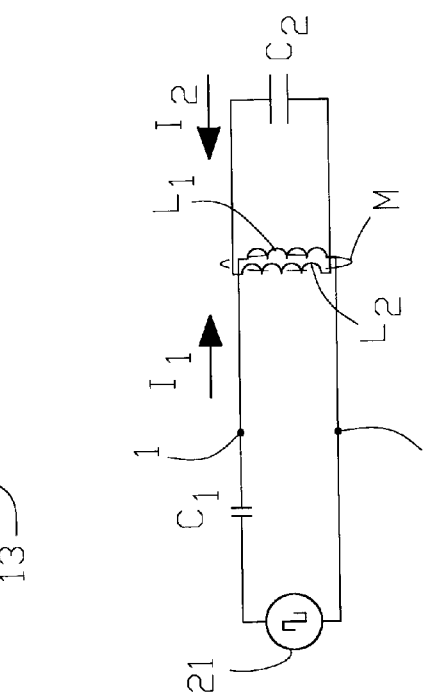
FIG. 3(c) is a simplified schematic illustrating another example of an induction furnace system with the improved efficiency coil system of the present invention.
Figure 3B:
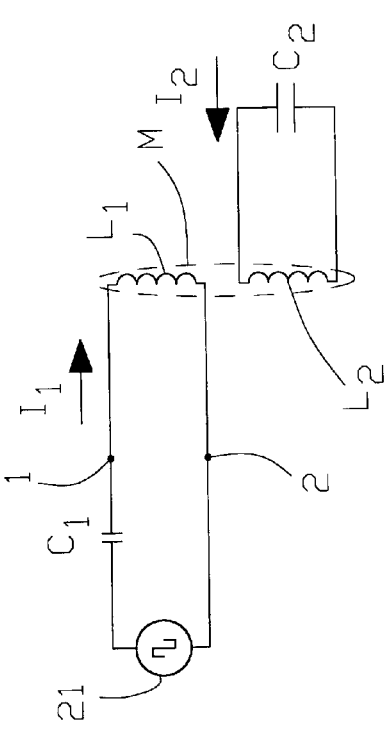
FIG. 3(b) is a simplified schematic illustrating one example of an induction furnace system with the improved efficiency coil system of the present invention.

Referring now to the drawings, wherein like numerals indicate like elements there is shown in FIG. 3(a) and FIG. 3(b), in accordance with the present invention, one example of an induction furnace system 10 utilizing a high efficiency coil system.

Coil $L_1$ (active coil) is connected at its end terminals to ac power source 20 that is operating at a controllable voltage and frequency to produce current $I_1$, in coil $L_1$. Coil $L_2$ (passive coil) is connected to capacitor $C_2$ to form a parallel L-C tank circuit. The magnetic field created by the flow of current in coil $L_1$ creates a flux field that is magnetically coupled to coil $L_2$ (as indicated by mutual inductance M in the figures), which induces current $I_2$ in coil $L_2$. The induced current $I_2$ has the same frequency as current $I_1$. The magnetic fields created by current flowing in coils $L_1$ and $L_2$ will inductively heat and melt electrically conductive material 12 placed in the crucible 13.

The magnitude and phase of $I_2$ also depends up the selected impedance values of coil $L_2$ and capacitor $C_2$ in the tank circuit formed by these components.

The voltage across coil $L_2$ generates a back voltage on coil $L_1$, which opposes the supply voltage that controls the flow of current $I_1$, in $L_1$. As a result, coil $L_1$ draws less current from the inverter while the induction furnace system 10 generates the same magnitude of power, thus allowing downsizing of electrical components for the power supply while maintaining the same level of heating and melting power.

Further the reactance of capacitor $C_2$ in the tank circuit substantially improves the low lagging power factor of the induction coil to provide a higher efficiency coil system.

While a voltage-fed half-bridge converter with series tank capacitor is used in FIG. 3(a), FIG. 3(b) illustrates a more general example of the induction furnace system of the present invention wherein the converter (power supply) is generically identified as element 21. In FIG. 3(a), which for this example of the invention is configured as a half-bridge converter, capacitor $C_1$ is shown as a distributive capacitance across the half-bridge, whereas in FIG. 3(b) capacitor $C_1$ is generally shown as a single circuit element.

The high efficiency coil system of the present invention can be utilized with various types of power supply topologies, such as (but not limited to) series resonant voltage-fed converters and converters utilizing pulse width modulation, to take advantage of the improved efficiency coil system.

Figure 10:
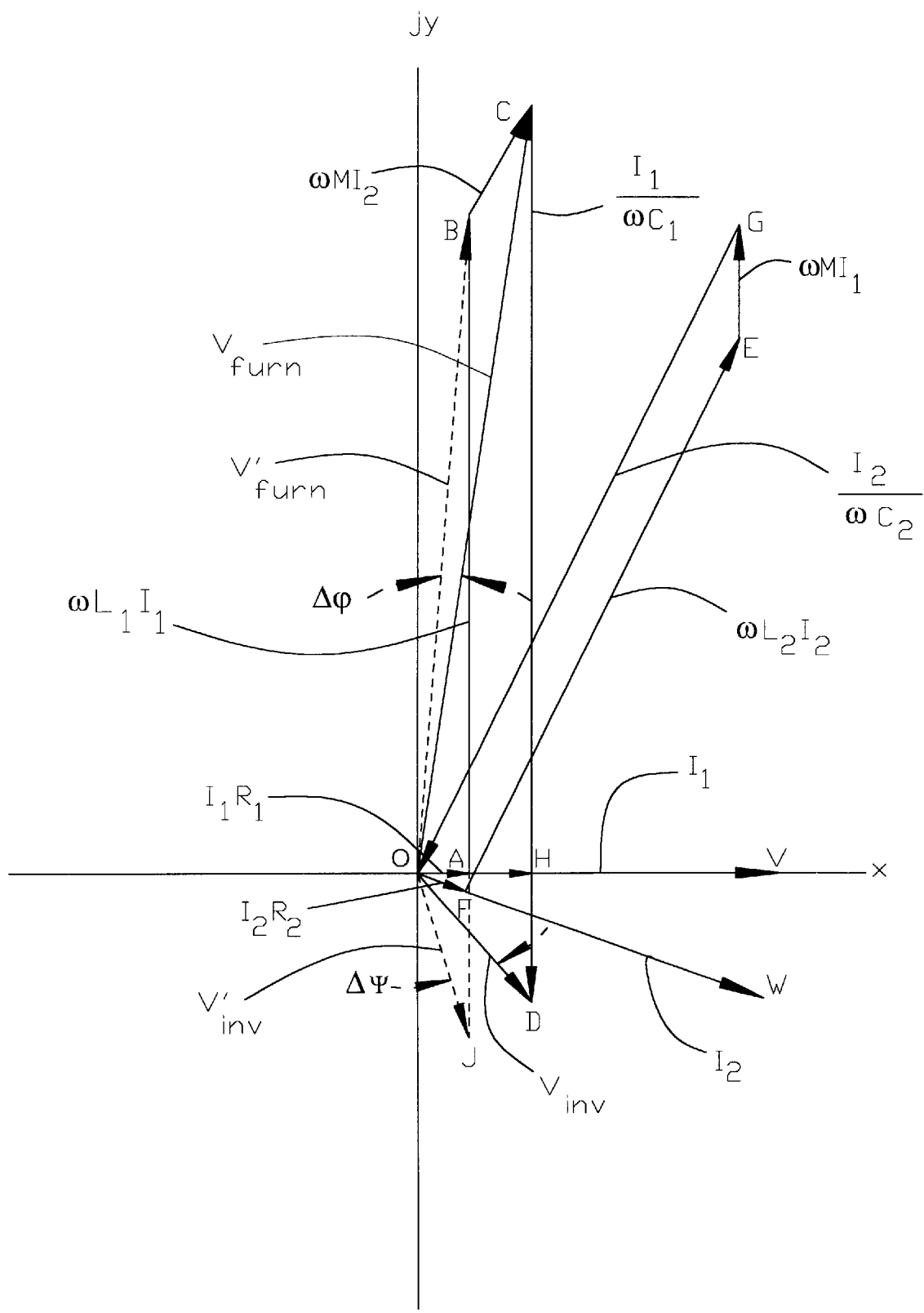
FIG. 10 is a vector diagram illustrating the advantages of an induction furnace system with the improved efficiency coil system of the present invention.

The present invention can be further appreciated by the vector diagram shown in FIG. 10. In the figure, with respect to the active coil circuit, vector OV represents current $I_1$ in active coil $L_1$ as illustrated FIG. 3(a) through FIG. 3(c). Vector OA represents the resistive component of the active coil's voltage, $I_1R_1$ ($R_1$ not shown in the figures). Vector AB represents the inductive component of the active coil's voltage, $\omega L_1 I_1$ (where $\omega$ equal $2\pi$ times f, the operating frequency of the power supply). Vector BC represents the voltage, $\omega M I_2$, induced by the passive coil $L_2$ onto active coil $L_1$. Vector CD represents the voltage, $I_1/\omega C_1$, on series capacitors $C_1$ connected between the inverter section of the power supply and active coil $L_1$. Vector OD represents the output voltage, $V_{inv}$, of the inverter (terminals 3 and 4 in FIG. 3(a)).

With respect to the passive coil circuit, vector OW represents current $I_2$ in passive coil $L_2$ that is induced by the magnetic field produced by current $I_1$. Vector OF represents the resistive component of the passive coil's voltage, $I_2R_2$ ($R_2$ not shown in the figures). Vector FE represents the inductive component of the pasive coil's voltage, $\omega L_2 I_2$. Vector EG represents the voltage, $\omega M I_1$, induced by the active coil $L_1$ onto passive coil $L_2$. Vector GO represents the voltage, $I_2/\omega C_2$, on capacitor $C_2$, which is connected across passive coil $L_2$.

The active coil circuit is driven by voltage source, $V_{inv}$, while the passive coil loop is not connected to an active energy source. Since the active and passive coils are mutually coupled, vector BC is added to vector OB, which represents the voltage ($V'_{furn}$) across an active furnace coil in the absence of a passive capacitive furnace coil circuit, to result in vector OC, which is the voltage ($V_{furn}$) across an active furnace coil with a passive capacitive furnace coil circuit of the present invention. The resultant furnace voltage, $V_{furn}$, with a smaller lagging power factor angle, $\phi$ (counterclockwise angle between the x-axis and vector OC), than the conventional furnace as represented by vector OB (shown in dashed lines). As illustrated in FIG. 10, there is a power factor angle improvement of $\Delta\phi$.

In the present invention, the inductive impedance in the passive coil is substantially compensated for by the capacitive impedance (i.e., $\omega L_2$. $1/\omega C_2$). The uncompensated resistive component, $R_2$, in the passive coil circuit is reflected into the active coil circuit by the mutual inductance between the two circuits, and the effective active coil circuit's resistance is increased, thus improving the power factor angle, or efficiency of the coil system.

Further the power factor angle, $\Psi$, for the output of the inverter improves by $\Delta\Psi$ as illustrated by the angle between vector OJ (the resultant vector ($V'_{inv}$) of resistive component vector OA and capacitive component vector AJ in the absence of a passive furnace coil circuit) and vector OD (the resultant vector ($V_{inv}$) of resistive component vector OH and capacitive component vector HD with the passive furnace coil circuit of the present invention).

In another example of the high frequency coil system of the present invention, as shown in FIG. 3(c), coils $L_1$ and $L_2$ can be fully or partially overlapped to increase the mutual inductance M between the two coils.

Figure 4:
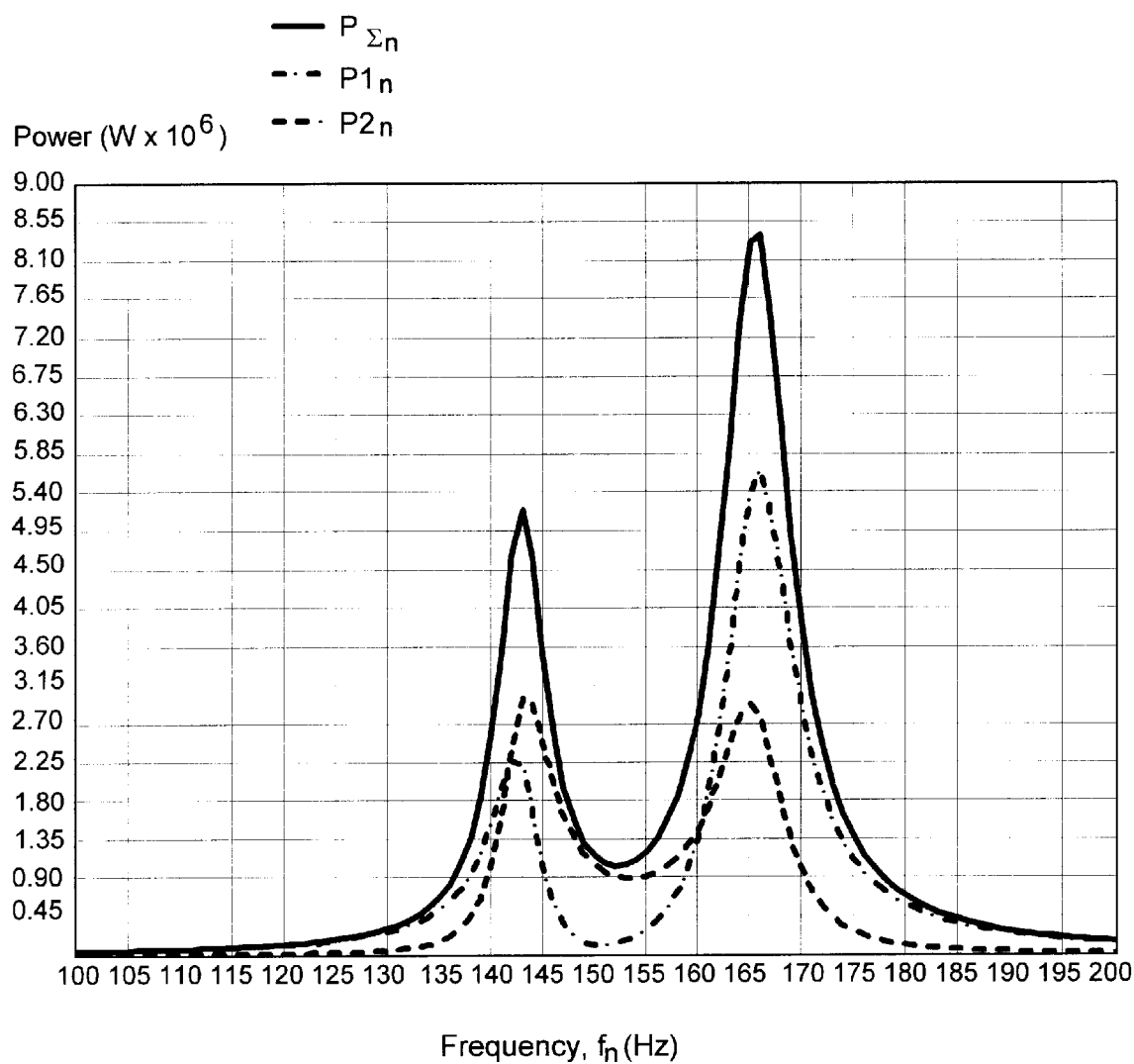
FIG. 4 is a graph illustrating the magnitude of power available for induction heating and melting as a function of system frequency for one example of an induction furnace system of the present invention.

As shown in FIG. 4 for one example of the present invention, coils $L_1$ and $L_2$ have two distinct resonant frequencies at approximately 144 Hertz and 166 Hertz, respectively. The same frequency approximations for resonance of coils $L_1$ and $L_2$ ignores the minor frequency offsets for resonance of the two coils that is shown in FIG. 4.

In FIG. 4, the $P1_n$ curve (shown in dot-dashed line) illustrates the magnitude of power in the coil $L_1$ circuit and the $P2_n$ curve (shown in dashed line) illustrates the magnitude of the power in the coil $L_2$ circuit. The $P\Sigma_n$ curve (shown in solid line) represents the summation of power in the coil $L_1$ and coil $L_2$ circuits. Power control can be achieved by varying the output frequency ($f_n$) of the power supply between dc and the frequency at which resonance occurs for coil $L_1$ (in this example, approximately 144 Hertz).

Figure 5:
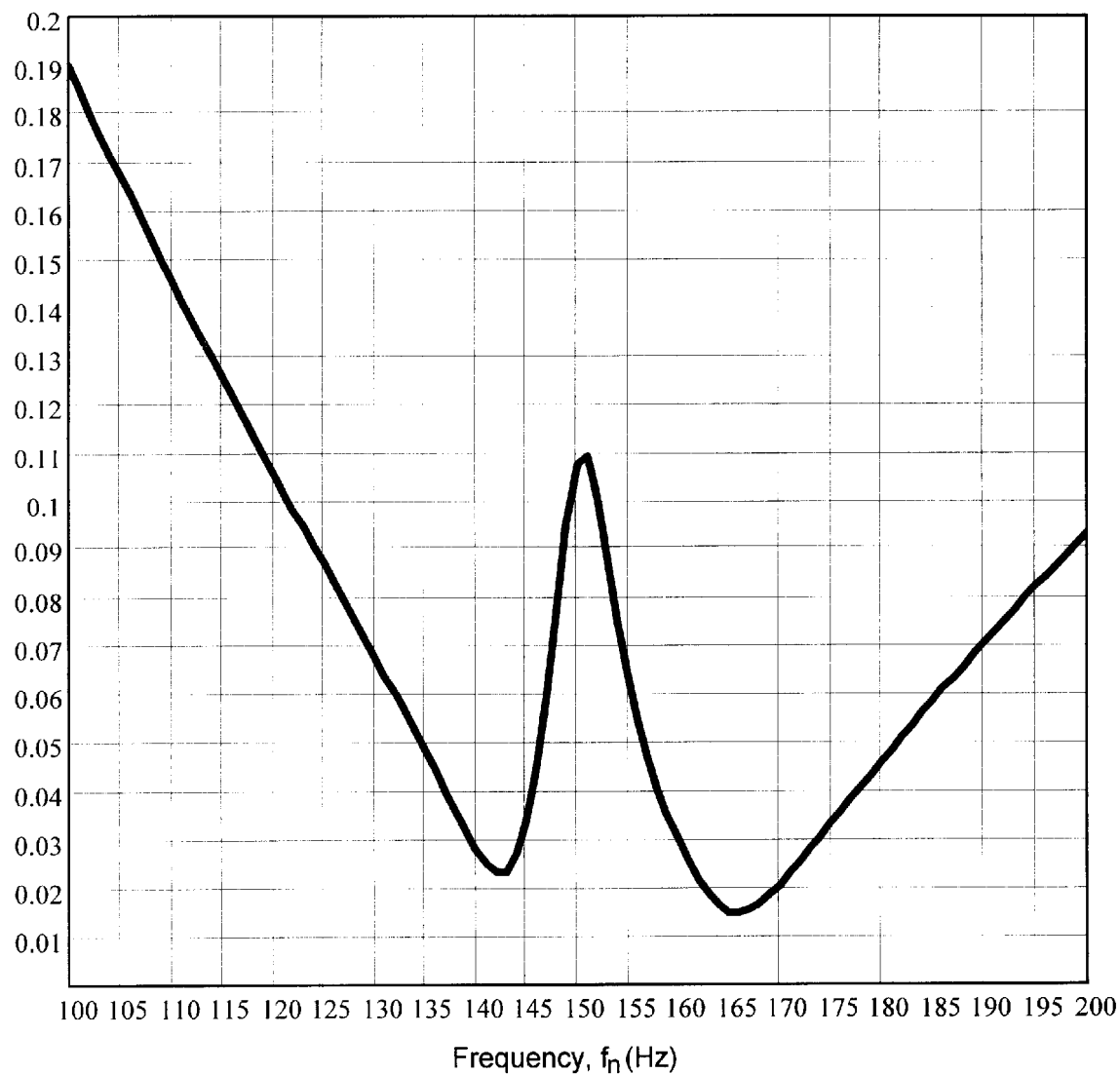
FIG. 5 is a graph illustrating the magnitude of the input impedance for the induction coil system as a function of system frequency for one example of the induction furnace system of the present invention.

FIG. 5 shows for one example of the present invention, the effect of the frequency ($f_n$) of the power supply, on the magnitude of the load impedance ($Z_n$), in ohms, at terminals 1 and 2 as shown in FIG. 3(a) and FIG. 3(b).

Figure 6:
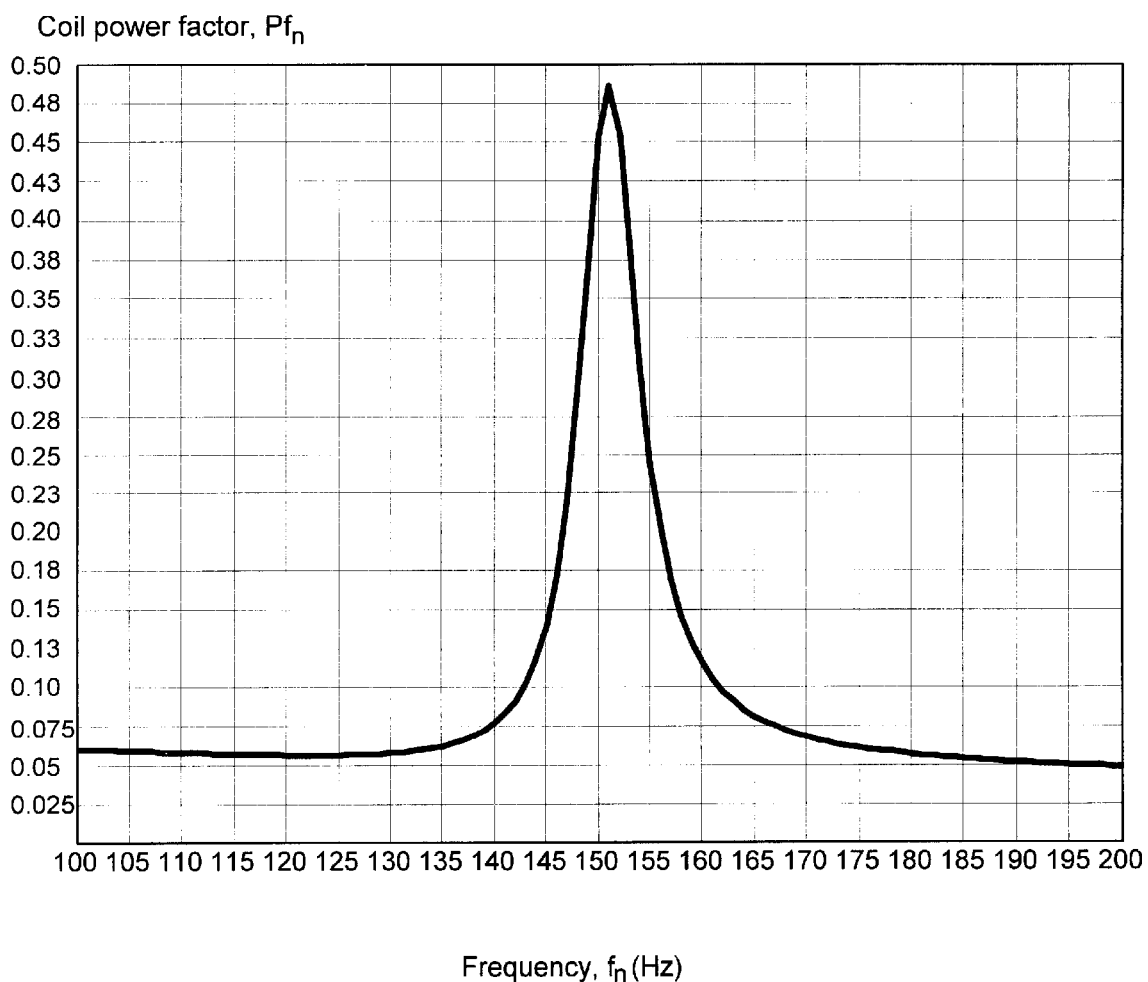
FIG. 6 is a graph illustrating the magnitude of the coil load power factor for the induction coil system as a function of system frequency for one example of the induction furnace system of the present invention.

FIG. 6 shows for one example of the present invention, the effect of the frequency ($f_n$) of the power supply, on the power factor ($Pf_n$) of the load circuit at terminals 1 and 2 as shown in FIG. 3(a) and FIG. 3(b). FIG. 6 illustrates the improved coil load power factor that can be achieved in one example of the present invention by operating the power supply in a range below the first resonant frequency of approximately 144 Hertz.

Figure 7:
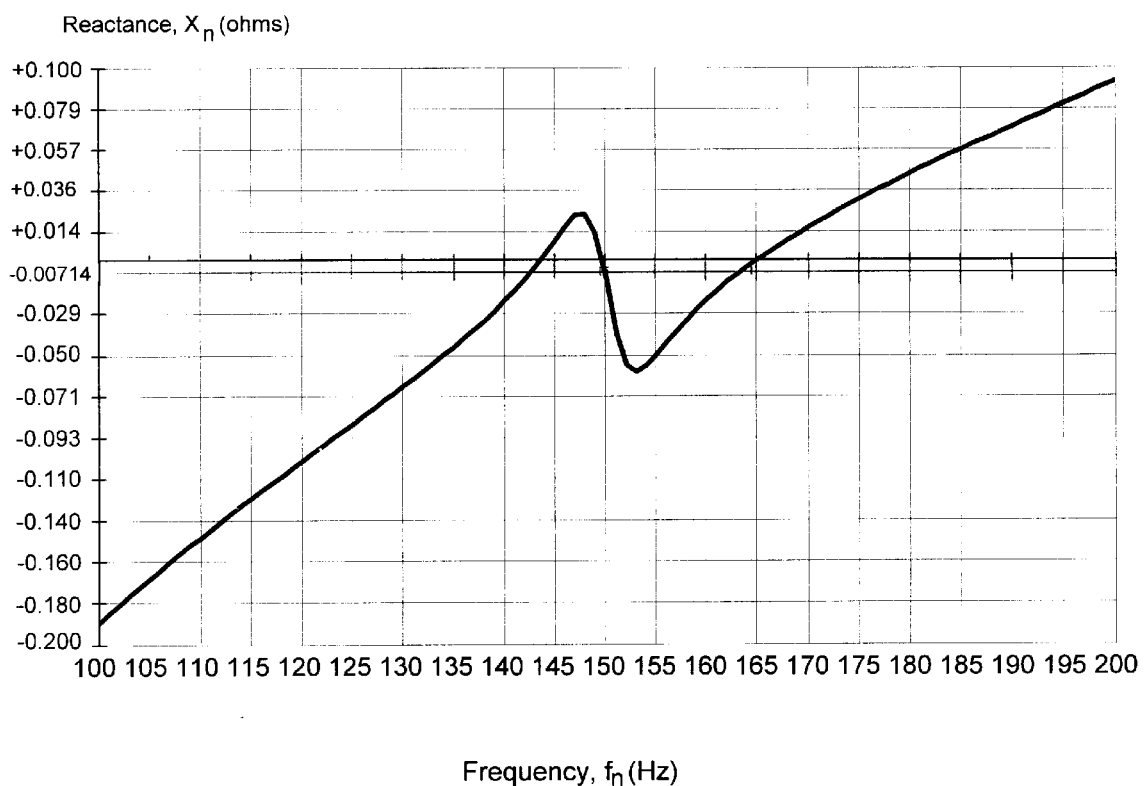
FIG. 7 is a graph illustrating the magnitude of the input reactance for the induction coil system as a function of system frequency for one example of the induction furnace system of the present invention.

FIG. 7 shows for one example of the present invention, the effect of the frequency ($f_n$) of the power supply, on the magnitude of the load reactance ($X_n$), in ohms, at terminals 1 and 2 as shown in FIG. 3(a) and FIG. 3(b).

Electromagnetic stirring of the molten material in the crucible can be adjusted by replacing capacitor $C_2$ of the passive reactance with a capacitor having a different value of reactance to change the resonant point in the parallel L-C tank circuit form ed by coil $L_2$ and capacitor $C_2$. In some applications, where the L-C tank circuit is located near the bottom of the crucible, capacitor $C_2$ is selected to minimize turbulence caused by excessive electromagnetic stirring near the bottom of the crucible to avoid removal of refractory material from the crucible that settles at the bottom of the molten material and contaminates it. Alternatively, capacitor $C_2$ can be an adjustable capacitor bank wherein the capacitance of capacitor $C_2$ can be easily adjusted.

Figure 8A:
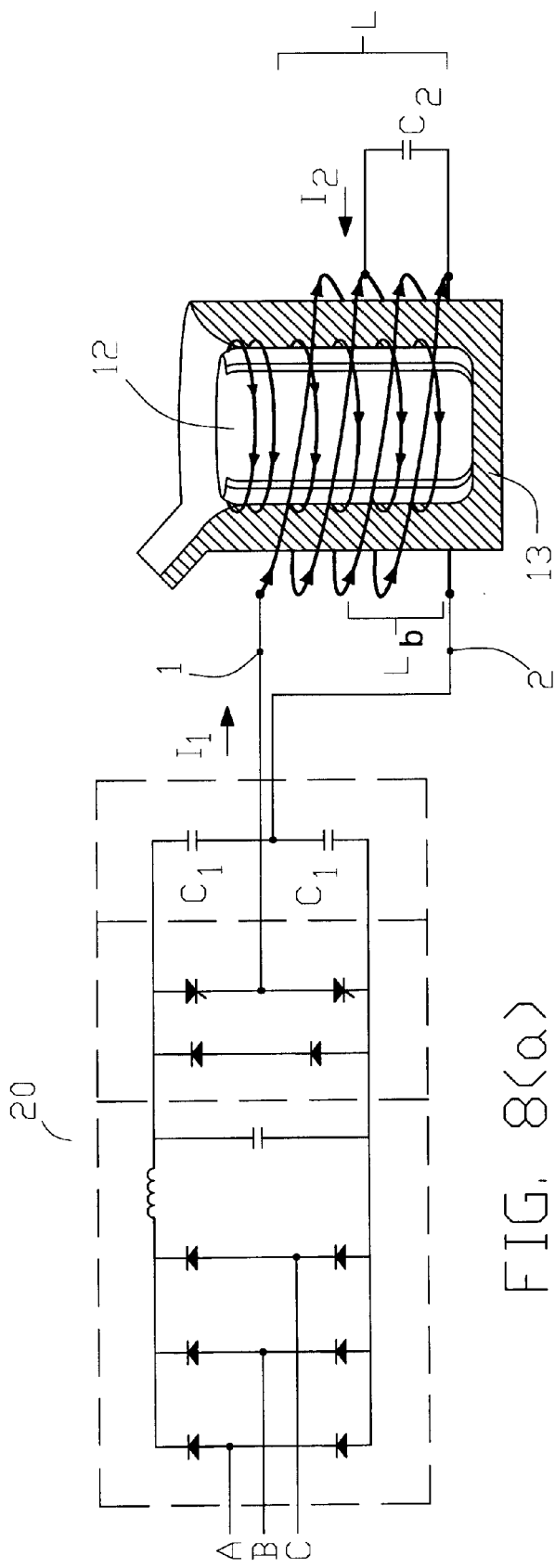
FIG. 8(a) is a diagrammatic plan illustrating another example of an induction furnace system with the improved efficiency coil system of the present invention.
Figure 8B:
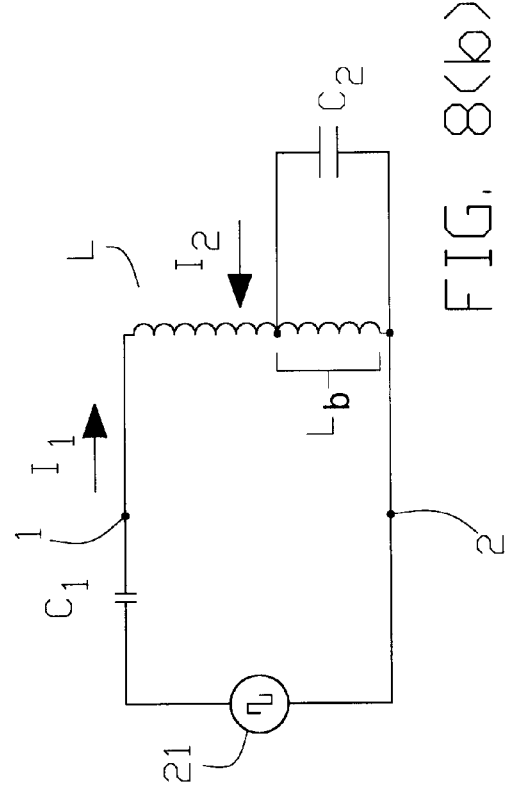
FIG. 8(b) is a simplified schematic illustrating another example of an induction furnace system with the improved efficiency coil system of the present invention.

FIG. 8(a) and FIG. 8(b) show an alternative example of the induction furnace system of the present invention wherein tuning capacitor $C_2$ is connected across a partial section, $L_b$, of coil L, which is connected at its end terminals (1 and 2) to the output of the power supply 20 in FIG. 8(a) or power supply 21 in FIG. 8(b). In this example, coil L functions as an autotransfomer with power applied across the entire coil. The L-C tank circuit form ed by partial coil section $L_b$ and capacitor $C_2$ improves the overall efficiency of the induction coil circuit.

Figure 9A:
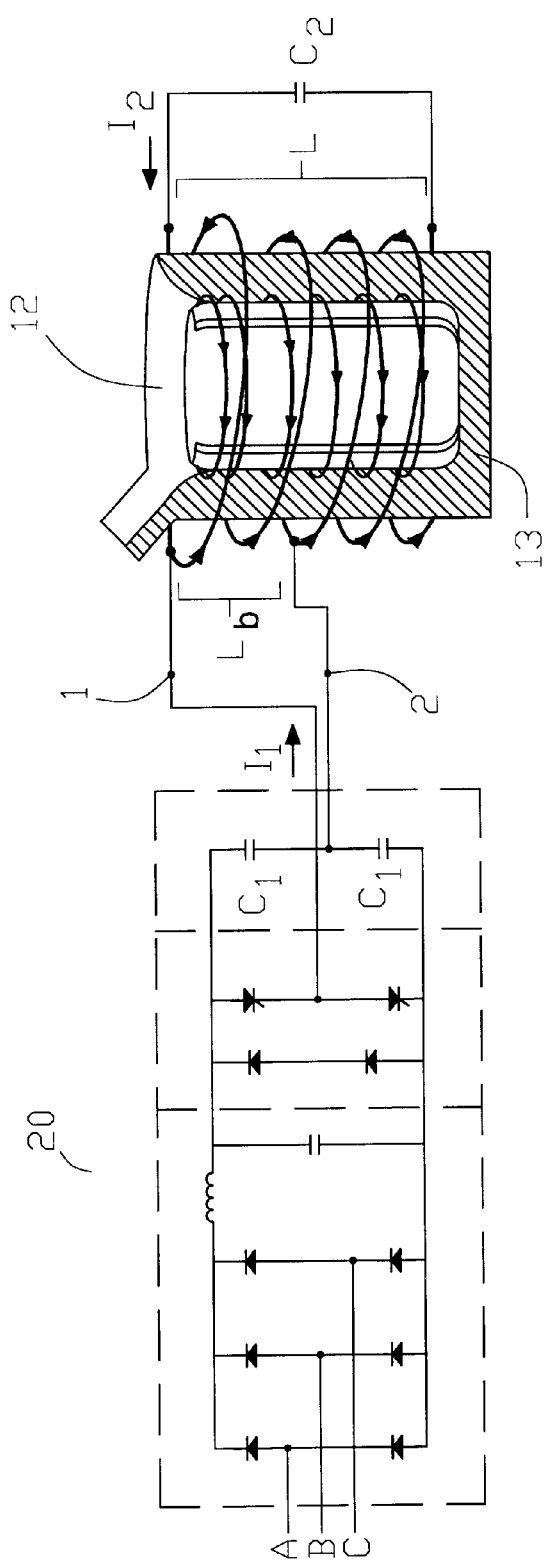
FIG. 9(a) is a diagrammatic plan illustrating another example of the induction furnace system with the improved efficiency coil system of the present invention.
Figure 9B:
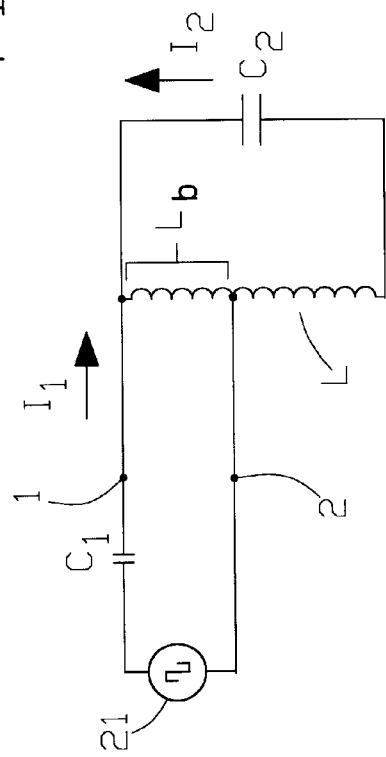
FIG. 9(b) is a simplified schematic illustrating another example of an induction furnace system with the improved efficiency coil system of the present invention.

FIG. 9(a) and FIG. 9(b) shows another alternative example of the induction furnace system of the present invention wherein tuning capacitor $C_2$ is connected across the end terminals of coil L, which has a partial section, $L_b$, connected to the output of the power supply 20 in FIG. 9(a) or power supply 21 in FIG. 9(b). In this example, coil L functions as an autotransformer with power applied across a partial section of the entire coil. The L-C tank circuit formed by induction coil L and capacitor $C_2$ improves the overall efficiency of the induction coil circuit.

Figure 11:
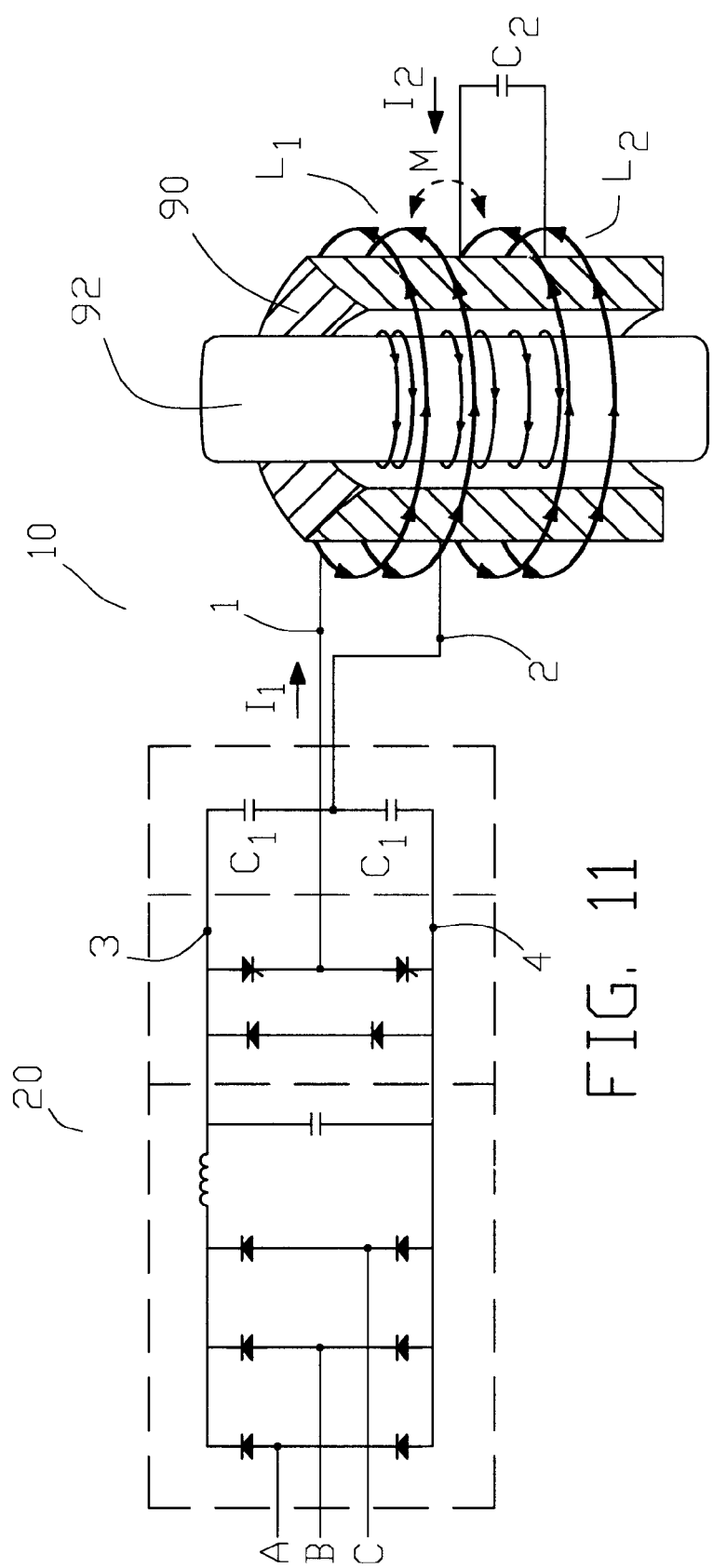
FIG. 11 is a simplified schematic illustrating another example of an example of an induction furnace system with the improved efficiency coil system of the present invention.

FIG. 11 illustrates another example of the present invention wherein crucible 90 comprises an open-ended thermally insulated material surrounded by induction coils. While the crucible 90 is shown as generally cylindrical in shape, the open-ended crucible may be otherwise configured as long as it allows electrically conductive material 92 pass through the crucible. The electrically conductive material may be, but is not limited to, a billet that passes through the crucible whereby the billet is inductively heated or melted. The crucible and the electrically conductive material may be oriented in other directions than that shown in FIG. 11, for example, horizontally rather than vertically. In this example, the coils, parallel L-C tank capacitor and power supply are similar to those in FIG. 3(a). This open-ended crucible can be used with any other examples of the present invention.

Other active and passive coil arrangements are within the scope of the disclosed invention. For example, either multiple active and/or multiple passive coil circuits maybe be utilized in various configurations having one or more overlapped coils and/or one or more non-overlapped coils. Further the active and passive coils may be alternatively arranged around the height of the crucible. For example, the passive coil may be disposed above the active coil.

While one type of power supply is shown in the figures for use with the high efficiency coil system of the invention, other power supply topologies, such as power supplies employing pulse width modulation techniques, can be used to the advantage of the coil system of the induction furnace system of the present invention.

The examples of the invention include reference to specific electrical components. One skilled in the art may practice the invention by substituting components that are not necessarily of the same type but will create the desired conditions or accomplish the desired results of the invention. For example, single components may be substituted for multiple components or vice versa.

The foregoing examples do not limit the scope of the disclosed invention. The scope of the disclosed invention is further set forth in the appended claims.

What is claimed is:

1. An induction furnace system comprising:
   a crucible;
   an induction coil system for inductively heating and melting the electrically conductive material placed in the crucible, the induction coil system comprising:
      a passive induction coil surrounding a first partial section of the crucible;
      a capacitor connected across the terminals of the passive induction coil to form a parallel L-C tank circuit;
      an active induction coil surrounding a second partial section of the crucible, the active induction coil disposed relative to the passive induction coil to create a magnetic coupling between the active and passive induction coils when a first ac current flows through the active induction coil; and
      a power supply having an input adapted to be connected to a source of power external to the induction furnace system and an ac output connected across the terminals of the active induction coil to supply the first ac current to the active induction coil, whereby the first ac current creates a first magnetic field to inductively heat and melt electrically conductive material placed in the crucible, and, by the magnetic coupling with the passive induction coil, the first ac current induces a second ac current in the passive induction coil, the passive ac current creating a second magnetic field to inductively heat and melt electrically conductive material in the crucible, and the resistance of the parallel L-C tank circuit is reflected into the active induction coil to improve the efficiency of the induction furnace system.

2. The induction furnace system of claim 1 wherein the passive induction coil at least partially overlaps the active induction coil.

3. The induction furnace system of claim 1 wherein the capacitance of the capacitor is adjusted to alter the magnetic stirring characteristics of the second magnetic field.

4. The induction furnace system of claim 1 wherein the crucible is an open-ended thermally insulated material.

5. The induction furnace system of claim 1, further comprising electrically conductive material placed in the crucible.

6. The induction furnace system of claim 5 wherein the crucible is an open-ended thermally insulated material and the electrically conductive material comprises a billet.

7. An induction furnace system comprising:
a crucible;
an induction coil system for heating and melting the electrically conductive material placed in the crucible, the induction coil system comprising:
an induction coil surrounding the crucible;
a capacitor connected across a partial section of the induction coil to form a parallel L-C tank circuit with the partial section of the induction coil; and
a power supply having an input connected to a source of power external to the induction furnace system and a single phase ac output connected across the terminals of the induction coil to supply a single phase ac current to the induction coil, whereby the single phase ac current creates a magnetic field to inductively heat and melt the electrically conductive material placed in the crucible, and the resistance of the parallel L-C tank circuit improves the efficiency of the induction furnace system.

8. The induction furnace system of claim 7, wherein the crucible is an open-ended thermally insulated material.

9. The induction furnace system of claim 8, comprising electrically conductive material comprising a billet placed in the crucible.

10. An induction furnace system comprising:
a crucible;
an induction coil system for heating and melting the electrically conductive material placed in the crucible, the induction coil system comprising:
an induction coil surrounding the crucible;
a capacitor connected across the terminals of the induction coil to form a parallel L-C tank circuit with the induction coil;
a power supply having an input arranged to be connected to a source of power and an ac output connected across a partial section of the induction coil to supply an ac current to the partial section of the induction coil, whereby the ac current creates a magnetic field to inductively heat and melt the electrically conductive material placed in the crucible, and the resistance of the parallel L-C tank circuit improves the efficiency of the induction furnace system.

11. The induction furnace system of claim 10, wherein the crucible is an open-ended thermally insulated material.

12. The induction furnace system of claim 11, comprising electrically conductive material comprising a billet placed in the crucible.

13. A method of inductively heating and melting an electrically conductive material in a crucible comprising the steps of:

surrounding a first partial section of the crucible with a passive induction coil;

connecting a capacitor to the terminals of the passive induction coil to form a parallel L-C tank circuit;

surrounding a second partial section of the crucible with an active induction coil;

providing a source of ac current to the active induction coil to generate a first magnetic field to inductively heat and melt the electrically conductive material and to induce an induced ac current in the passive induction coil by magnetic coupling the passive induction coil with the first magnetic field, whereby the induced ac current inductively heats and melts the electrical conductive material and the resistance of the parallel L-C tank circuit is reflected into the active induction coil to improve the efficiency of the induction furnace system.

14. The method of claim 13, further comprising the step of at least partially overlapping the passive coil section with the active coil section.

15. The method of claim 13, further comprising the step of adjusting the capacitance of the capacitor whereby the magnetic stirring characteristics of the second magnetic field are altered.

16. The method of claim 13, further comprising the step of passing the electrically conductive material through the crucible.

17. A method of inductively heating and melting an electrically conductive material placed in a crucible comprising the steps:

surrounding the crucible with an induction coil;

connecting a capacitor to a partial section of the induction coil to form a parallel L-C tank circuit comprising the capacitor and the partial section of the induction coil; and providing a source of a single phase ac current to the terminals of the induction coil to generate a magnetic field to inductively heat and melt the electrically conductive material, and whereby the parallel L-C tank circuit improves the efficiency of the induction furnace system.

18. The method of claim 17, further comprising the step of passing the electrically conductive material through the crucible.

19. A method of inductively heating and melting an electrically conductive material placed in a crucible comprising the steps:

surrounding the crucible with an induction coil;

connecting a capacitor to the terminals of the induction coil to form a parallel L-C tank circuit comprising the capacitor and the induction coil;

providing a source of ac current to a partial section of the induction coil to generate a magnetic field to inductively heat and melt the electrically conductive material, and whereby the parallel L-C tank circuit improves the efficiency of the induction furnace system.

20. The method of claim 19, further comprising the step of passing the electrically conductive material through the crucible.

* * * * *